US009692858B2

(12) United States Patent
Jain et al.

(10) Patent No.: US 9,692,858 B2
(45) Date of Patent: Jun. 27, 2017

(54) SECURITY MODEL FOR A MEMORY OF A NETWORK INFORMATION SYSTEM

(75) Inventors: Bhushan P. Jain, Jalgaon (IN); Sandeep R. Patil, Pune (IN); Dirk Pfeiffer, Hudson, NY (US); Sri Ramanathan, Lutz, FL (US); Gandhi Sivakumar, Victoria (AU); Matthew B. Trevathan, Kennesaw, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 246 days.

(21) Appl. No.: 13/550,830

(22) Filed: Jul. 17, 2012

(65) Prior Publication Data

US 2014/0026191 A1 Jan. 23, 2014

(51) Int. Cl.
| | | |
|---|---|---|
| *H04L 29/06* | (2006.01) | |
| *G06F 12/14* | (2006.01) | |
| *G06F 21/72* | (2013.01) | |
| *G06F 21/62* | (2013.01) | |
| *H04L 29/08* | (2006.01) | |

(52) U.S. Cl.
CPC .......... *H04L 69/24* (2013.01); *G06F 12/1458* (2013.01); *G06F 21/6218* (2013.01); *G06F 21/72* (2013.01); *H04L 67/10* (2013.01); *G06F 2221/2141* (2013.01); *H04L 63/08* (2013.01)

(58) Field of Classification Search
CPC ..... H04L 63/08; H04L 63/0807; H04L 63/20; H04L 67/10; G06F 21/72; G06F 12/1458; G06F 2221/2141
USPC .......................................................... 726/4
See application file for complete search history.

(56) References Cited

U.S. PATENT DOCUMENTS

| | | | |
|---|---|---|---|
| 6,510,522 B1 * | 1/2003 | Heinrich ................. | G06F 21/78 710/100 |
| 7,592,859 B2 | 9/2009 | Hastings | |
| 7,730,523 B1 * | 6/2010 | Masurkar .............. | H04L 63/083 726/4 |
| 7,752,407 B1 | 7/2010 | Langhammer et al. | |
| 7,895,447 B2 | 2/2011 | Dellow et al. | |
| 8,112,615 B1 | 2/2012 | Beard | |

(Continued)

OTHER PUBLICATIONS

Multi-Tenancy Based Access Control in Cloud; Xiao-Yong Li, Yong Shi, Yu-Guo,Wei Ma; School of Computer and Information; Beijing Jiaotong University; 2010; IEEE.*

(Continued)

*Primary Examiner* — James Turchen
(74) *Attorney, Agent, or Firm* — Christopher K. McLane; Andrew M. Calderon; Roberts Mlotkowski Safran Cole & Calderon, P.C.

(57) ABSTRACT

Systems and methods for providing information services are disclosed. A method includes passing an instance an object, invoked by a user, to a memory device at a hardware layer of a network information system, the object being hosted for a tenant of a network information service. The method further includes determining by a processing unit of the memory device that storage of the object is not authorized by the tenant based on a security map provided by the tenant and accessible by the processing unit within the hardware layer. The method further includes preventing storage of the instance in the memory device based on the result of the determining.

25 Claims, 7 Drawing Sheets

(56) References Cited

U.S. PATENT DOCUMENTS

| | | | | |
|---|---|---|---|---|
| 8,180,986 | B2* | 5/2012 | Harris | G06F 12/145 |
| | | | | 711/147 |
| 8,185,709 | B2* | 5/2012 | Kim | G06F 12/1458 |
| | | | | 711/163 |
| 8,196,175 | B2* | 6/2012 | Reed | H04L 63/0807 |
| | | | | 726/1 |
| 8,261,091 | B2* | 9/2012 | Barck | G06F 21/72 |
| | | | | 713/189 |
| 8,271,536 | B2* | 9/2012 | Amradkar | H04L 63/0807 |
| | | | | 707/802 |
| 8,296,321 | B2* | 10/2012 | Durdik | G06F 17/30522 |
| | | | | 707/781 |
| 8,336,089 | B1* | 12/2012 | Ahmed | G06F 21/00 |
| | | | | 726/5 |
| 8,353,012 | B2* | 1/2013 | Del Real | G06F 21/6218 |
| | | | | 705/326 |
| 8,356,361 | B2* | 1/2013 | Werner | G06F 12/1433 |
| | | | | 709/225 |
| 8,359,633 | B2* | 1/2013 | Kubota | G06F 21/41 |
| | | | | 709/203 |
| 8,438,621 | B2* | 5/2013 | Zhang | G06F 21/335 |
| | | | | 380/229 |
| 8,473,469 | B1* | 6/2013 | Yancey | G06F 17/30371 |
| | | | | 707/703 |
| 8,566,612 | B2* | 10/2013 | Davis | G06F 21/72 |
| | | | | 370/218 |
| 2002/0042924 | A1* | 4/2002 | Adams | H04L 29/06027 |
| | | | | 725/114 |
| 2003/0126453 | A1 | 7/2003 | Glew et al. | |
| 2008/0115108 | A1 | 5/2008 | Gunji | |
| 2008/0148343 | A1 | 6/2008 | Taniguchi | |
| 2009/0228967 | A1 | 9/2009 | Gbadegesin et al. | |
| 2009/0249019 | A1* | 10/2009 | Wu | G06F 12/023 |
| | | | | 711/171 |
| 2009/0249465 | A1 | 10/2009 | Touboul | |
| 2010/0017415 | A1* | 1/2010 | Kurumai | H04L 63/104 |
| | | | | 707/E17.005 |
| 2010/0122088 | A1 | 5/2010 | Oxford | |
| 2010/0125612 | A1 | 5/2010 | Amradkar et al. | |
| 2010/0174848 | A1 | 7/2010 | Hana et al. | |
| 2010/0235647 | A1 | 9/2010 | Buer | |
| 2010/0281273 | A1 | 11/2010 | Lee et al. | |
| 2011/0022642 | A1 | 1/2011 | Demilo et al. | |
| 2011/0023111 | A1 | 1/2011 | Gunadisatra et al. | |
| 2011/0099384 | A1 | 4/2011 | Grange et al. | |
| 2011/0119307 | A1* | 5/2011 | Unger | G06F 17/30867 |
| | | | | 707/783 |
| 2011/0131275 | A1 | 6/2011 | Maida-Smith et al. | |
| 2011/0270886 | A1* | 11/2011 | An | G06F 17/3007 |
| | | | | 707/785 |
| 2011/0276914 | A1* | 11/2011 | Ahlgren | G06F 9/468 |
| | | | | 715/771 |
| 2011/0302415 | A1 | 12/2011 | Ahmad et al. | |
| 2011/0307947 | A1* | 12/2011 | Kariv | H04L 63/08 |
| | | | | 726/9 |
| 2012/0215918 | A1* | 8/2012 | Vasters | H04L 67/02 |
| | | | | 709/226 |
| 2013/0097379 | A1* | 4/2013 | Ide | G06F 12/0871 |
| | | | | 711/118 |
| 2013/0275771 | A1* | 10/2013 | Moran | G06F 21/32 |
| | | | | 713/193 |

OTHER PUBLICATIONS

Buecker, A. et al., "Cloud Security Guidance", IBM Redpaper; 2009; 22 pages.

"Method of Creating a Componentized Architecture for Unifying Resource Sharing Scenarios in Cloud Computing Environment", IBM; Feb. 11, 2010; downloaded from http://priorartdatabase.com/IPCOM/000193146D, 13 pages.

Office Action dated Apr. 11, 2013 in U.S. Appl. No. 13/543,628, 9 pages.

Final Office Action dated Sep. 18, 2013 in U.S. Appl. No. 13/543,628, 9 pages.

Davenport, J.H., "Cryptography and Security in Clouds," IBM Forum Zurich, http://www.zurich.ibm.com/~cca/csc2011/program.html, Mar. 15-16, 2011, 35 pages.

Sadeghi et al., "Token-Based Cloud Computing," Trust'10 Proceedings of the 3rd Int'l Conf. on Trust and Trustworthy Computing, 2010, 13 pages.

Mell et al., "The NIST Definition of Cloud Computing", National Institute of Standards and Technology, Information Technology Laboratory, Version 15, Oct. 7, 2009, 2 pages.

Suh, G. Edward et al., "Physical Unclonable Functions for Device Authentication and Secret Key Generation", DAC 2007, Jun. 4-8, 2007, San Diego, CA, 6 pages.

Holcomb, Daniel E. et al., "Power-up SRAM State as an Identifying Fingerprint and Source of True Random Numbers", IEEE Transactions on Computers, vol. 57, No. 11, p. 1-14, Nov. 2008.

Office Action dated Oct. 19, 2016 in related U.S. Appl. No. 13/543,628, 12 pages.

Notice of Allowance in related U.S. Appl. No. 13/543,628 dated Mar. 9, 2017, 22 pages

* cited by examiner

| TENANT ID 505 | USER ID 508 | PASSCODE 511 | SECURITY CODE 513 | ALLOTTED MEMORY RANGE 517 |
|---|---|---|---|---|
| A | User 445 | XXXXXX | YYYYY | ZZZZ-ZZZZZ |
| | ... | ... | ... | ... |

SECURITY MODEL FOR A MEMORY OF A NETWORK INFORMATION SYSTEM

FIELD OF THE INVENTION

The invention relates to systems that provide information security in a network environment, and methods thereof.

BACKGROUND

The emerging cloud computing paradigm offers infrastructure-as-a-service (IaaS), software-as-a-service (SaaS), and platform-as-as-service (PaaS). Such services can have a multi-tenant based architecture in which the software or infrastructure is shared across multiple clients. Authentication and authorization occurs at upper layers of these services (e.g., at a management layer). As such, the IaaS, SaaS, and PaaS security can have a thin level of security that does not ensure protection of information at lower levels of these services. While clients of these services may appreciate the benefits of SaaS, IaaS and PaaS, they may lack confidence that the services can protect sensitive or critical information from unauthorized access.

Accordingly, there exists a need in the art to overcome the deficiencies and limitations described hereinabove.

BRIEF SUMMARY

In an aspect of the invention, a method of providing an information service comprises passing an instance an object, invoked by a user, to a memory device at a hardware layer of a network information system. The object is one of a plurality of objects hosted for a tenant of a network information service. The method further comprises determining by a processing unit of the memory device that storage of the object is not authorized by the tenant based on a security map provided by the tenant and accessible by the processing unit within the hardware layer. The method further comprises preventing storage of the instance in the memory device based on the result of the determining.

In another aspect of the invention, a system for providing an information service to a tenant comprises a security processor and a computer-readable memory storing a security map and accessible by the security processor. The security processor accesses the security map and matches credentials of a user passed to the security processor in an instance with the security map and prevents the storing of information in a memory device.

In accordance with additional aspects of the present invention, a computer program product comprising a computer readable storage medium having readable program code embodied in the storage medium, is operable to instantiate one or more objects stored within a library in a memory device at a hardware layer by receiving credentials of an owner of the one or more objects.

In accordance with additional aspects of the present invention, a computer system comprises a CPU, a computer readable memory and a computer readable storage media. The system further comprises first program instructions to pass an instance an object of to a memory device of a hardware layer of a network information system, the object being one of a plurality of objects hosted for a tenant that has been invoked by a user. The system further comprises second program instructions to determine that storage of the object in the memory device is not authorized by the tenant based on a security map provided by the tenant. The system further comprises third program instructions to prevent storage of the instance in the memory device based on the result of the determining. The first, second and third program instructions are stored on the computer readable storage media for execution by the CPU via the computer readable memory.

In accordance with additional aspects of the present invention, a method of deploying a system for providing an information service to a tenant comprises providing a computer infrastructure, operable to pass an instance of an object to a memory device of a hardware layer of a network information system. The object is one of a plurality of objects hosted for a tenant that has been invoked by a user. The computer infrastructure is further operable to determine by a processing unit of the memory device that storage of the object is not authorized by the tenant based on a security map provided by the tenant and accessible by the processing unit within the hardware layer.

BRIEF DESCRIPTION OF THE DRAWINGS

The present invention is described in the detailed description that follows, in reference to the noted plurality of drawings by way of non-limiting examples of exemplary embodiments of the present invention.

FIG. 5 shows an exemplary data structure for a security map in accordance with aspects of the present invention;

DETAILED DESCRIPTION

Figure 1:
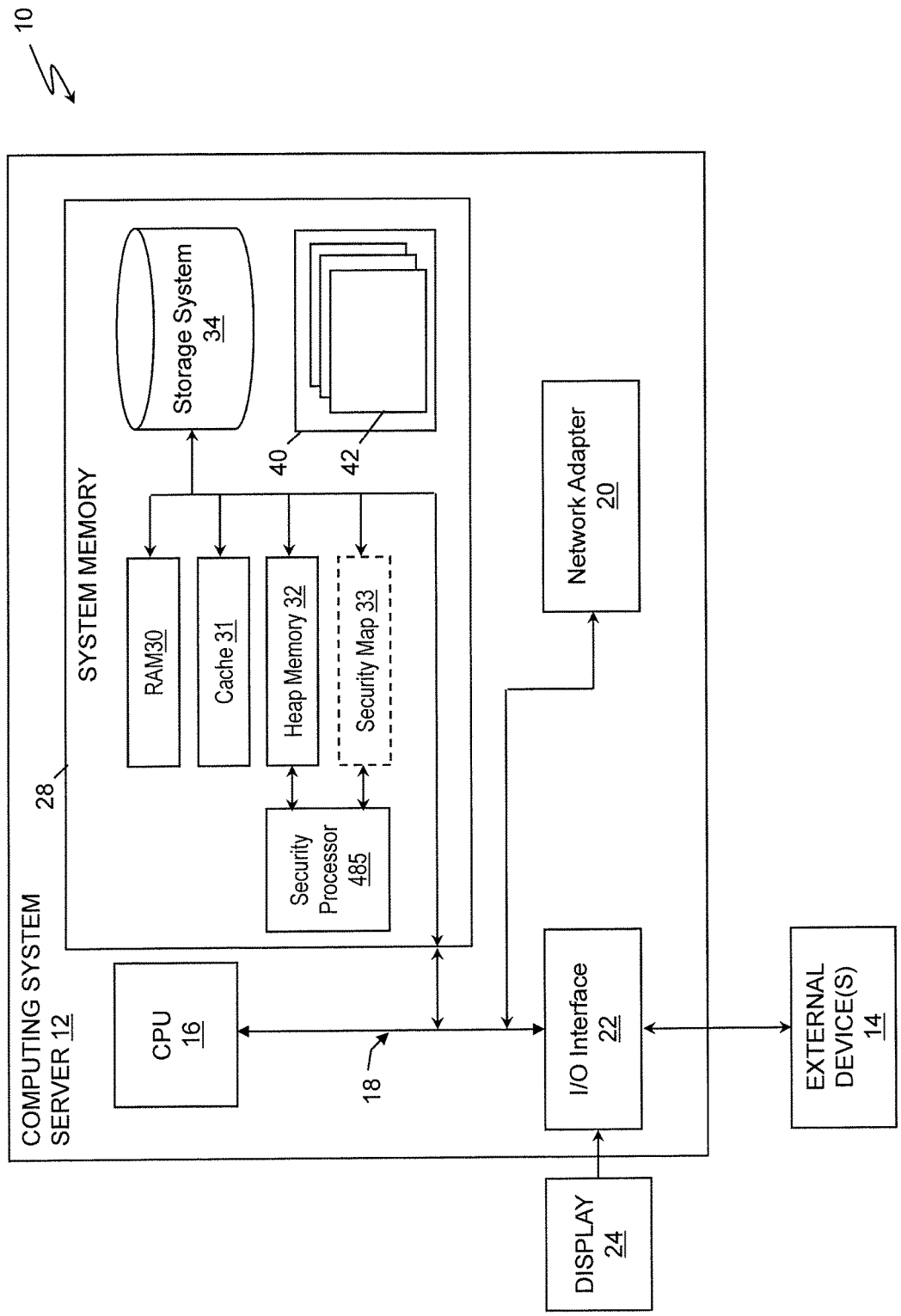
FIG. 1 shows a cloud computing node in accordance with aspects of the present invention.

The invention relates to systems that provide information security in a network environment, and methods thereof. According to aspects of the invention, a network information system provides services that maximize a tenant's (owner of information stored in a cloud environment) trust in the system's ability to keep information secure by allowing the tenant to control the use of their respective information. For example, a tenant of a multi-tenant IaaS may directly participate in a security control mechanism and process that prevents other tenants or users from invoking instances of program code of the tenant that is hosted on the computing infrastructure.

According to aspects of the invention, a security processor resides in the memory of the network information system. For example, the security processor can be embedded in the integrated circuits that comprise the memory. Alternatively, the security processor can be co-located with the IC. In embodiments, the ICs function as the heap memory of the system can include a programmable device that provides the security processor. Tenants of the network information system possess a key which is verified by the security processor when a user attempts to invoke an object hosted for the tenant by the system. The security code can be assigned to the tenant by the system or the security code can generated by the tenant. Further, the security code can be a static or dynamic token (e.g., a one-time password).

For example, after a user invokes a program object of a tenant, a classloader is executed that attempts to store the instance of the object in an allotted portion of the heap memory. The classloader can pass a copy of a security code to the heap memory, whereas the security processor within the heap memory receives the credential and compares it to a security map previously stored in the system by the tenant. If the security processor determines that the received credential matches one or more corresponding values in the security map, the security processor allows the instance to be created in the allotted portion of memory. If not, the security processor halts writing of the instance. Because this process allows the tenant to participate in the security process by providing and/or managing the security map, a compliant and trustful relationship can be maintained between the tenant and the service which, in turn, can result in more business for the service provider.

Although the exemplary process described above verifies the security code after instantiation of an object by the user, it is contemplated that the security processor can require a security code from the user on a periodic basis. Further, while the security code is described as a single item, the security code can be a series of codes and/or a dynamically varying code. Moreover, while the security code is described as corresponding to an entire object, embodiments can use a number of security codes that correspond to parts (e.g., segments) of an object.

CLOUD COMPUTING

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud user can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple users using a multi-tenant model, with different physical and virtual resources dynamically assigned and reassigned according to demand. There is a sense of location independence in that the user generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the user, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and user of the utilized service.

Service Models are as follows:

Software as a Service (SaaS): the capability provided to the user is to use the provider's applications running on a cloud infrastructure. The applications are accessible from various client devices through a thin client interface such as a web browser (e.g., web-based email). The user does not manage or control the underlying cloud infrastructure including network, servers, operating systems, storage, or even individual application capabilities, with the possible exception of limited user-specific application configuration settings.

Platform as a Service (PaaS): the capability provided to the user is to deploy onto the cloud infrastructure user-created or acquired applications created using programming languages and tools supported by the provider. The user does not manage or control the underlying cloud infrastructure including networks, servers, operating systems, or storage, but has control over the deployed applications and possibly application hosting environment configurations.

Infrastructure as a Service (IaaS): the capability provided to the user is to provision processing, storage, networks, and other fundamental computing resources where the user is able to deploy and run arbitrary software, which can include operating systems and applications. The user does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable user electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16. Further, in accordance with aspects of the invention, the computing system server 12 also includes a security processor 485.

In embodiments, the security processor 485 provides solutions to ensure security when a system attempts to store an instance of an object invoked by a user in system memory, such as heap memory 32. A tenant-controlled security map 33 holds one or more security codes of the tenant in association with other information, identifiers of users, and allocated portions of the memory 28. The security map 33 can be included in the security processor 485 or it can be external to the security processor 485. In more specific embodiments, when a classloader attempts to create an instance of an object invoked by a user in an allotted portion of a heap memory 32, a credential of a user (e.g., an user identifier and/or a user passcode) and a security code from the tenant is passed to the security processor 485 as a preamble. The security processor 485 will only allow creation of the instance in the heap memory 32 if the credential and the security code matches what is in the security map 33.

In embodiments, the security processor 485 can be integrated with one time passcode (OTP) based gadgets like Rational Software Architecture secure ID. The security processor 485 can access the security map designed for parts of the code or globally and can be assigned with dynamically varying passcodes. Such credentials can be applied across the entire code or parts of an object. The security processor 485 can also possess the intelligence to ignore cloud based security map when processing codes for traditional usage, such as when no security code is associated with an user or an allotted memory range.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 31. Further, in accordance with aspects of the invention, system memory 28 includes heap memory 32 and security map 33. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

As will be appreciated by one skilled in the art, aspects of the present invention, including aspects of the security processor 485 and the functionality provided therein, may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
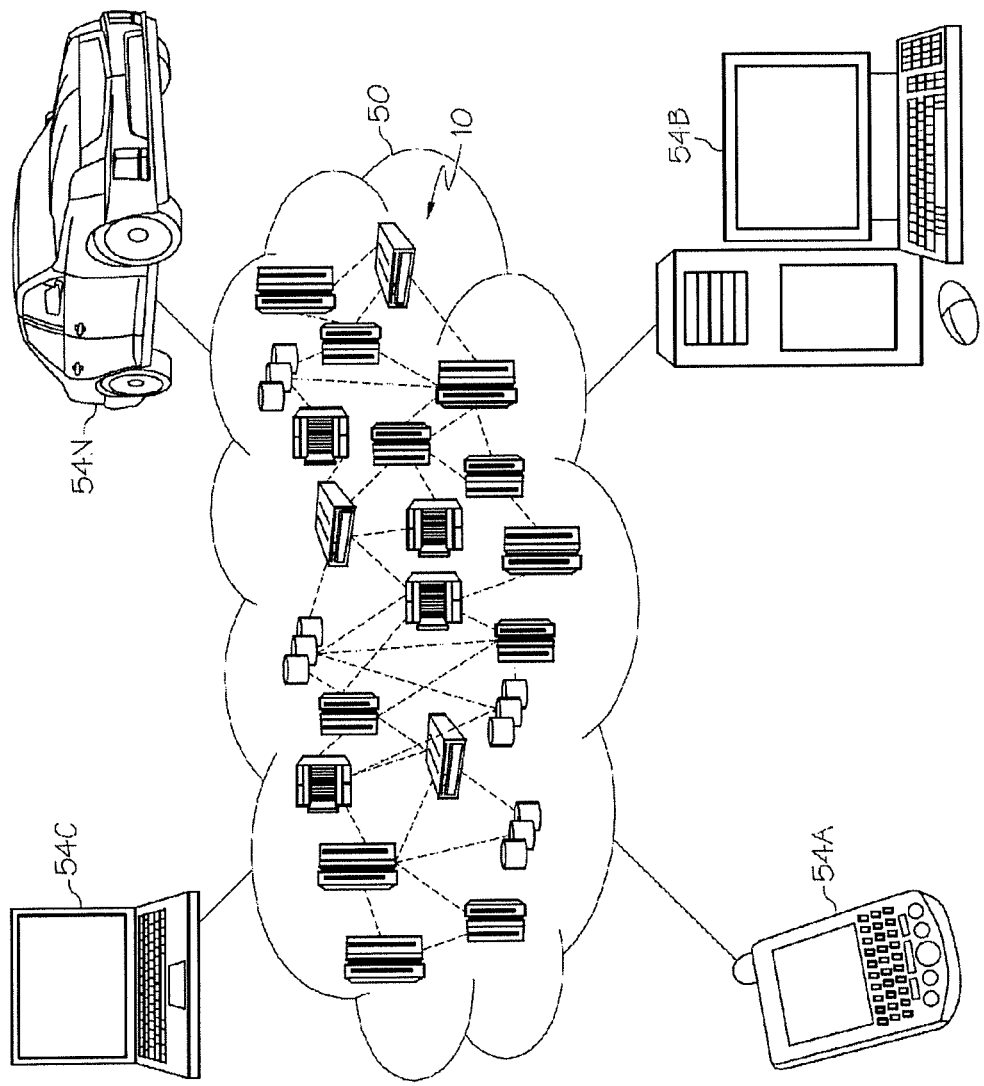
FIG. 2 shows a cloud computing environment in accordance with aspects of the present invention.

Referring now to FIG. 2, illustrative cloud computing environment 50 is depicted. As shown, cloud computing environment 50 comprises one or more cloud computing nodes 10 with which local computing devices used by cloud users, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud user does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
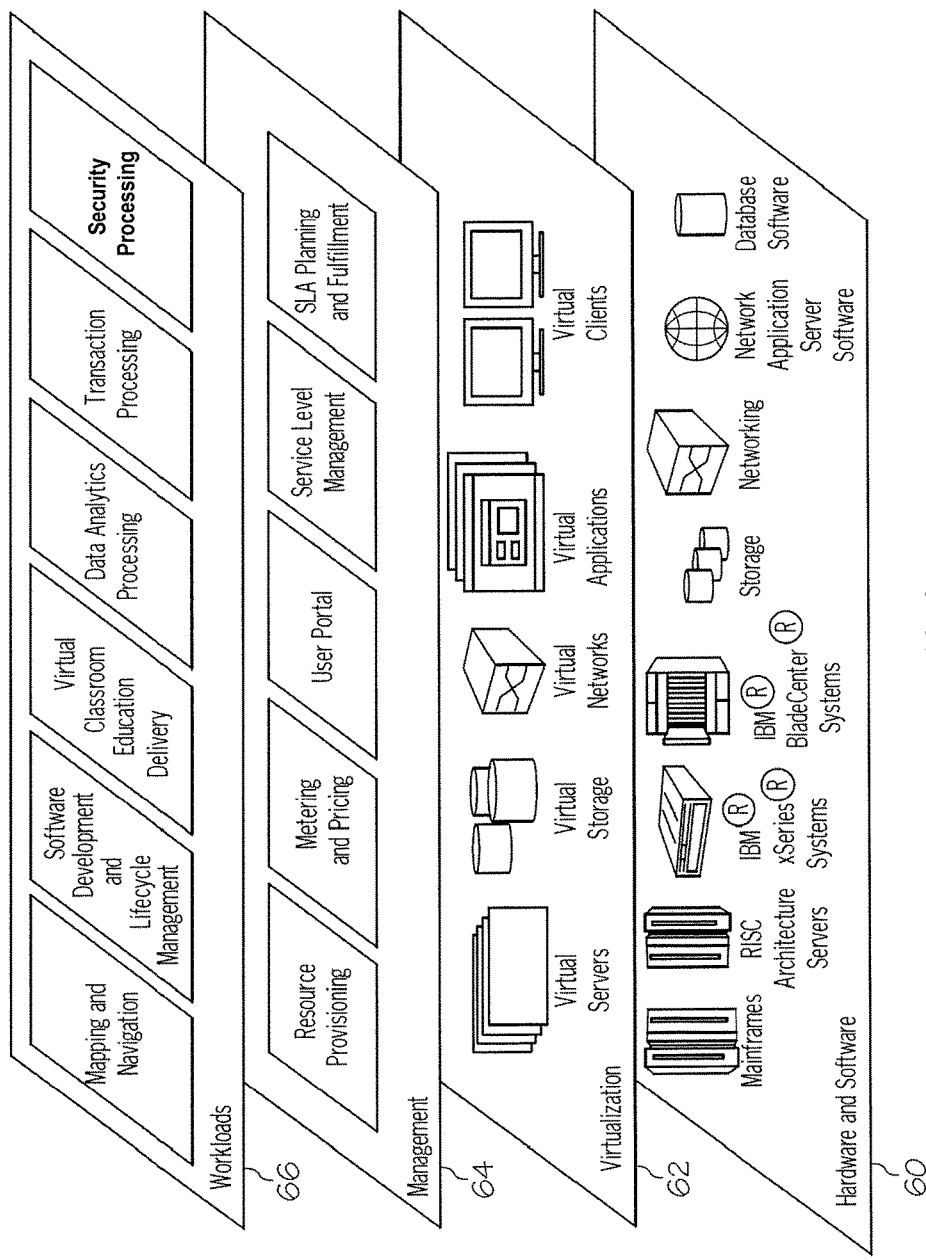
FIG. 3 shows abstraction model layers in accordance with aspects of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud users and tasks, as well as protection for data and other resources. User portal provides access to the cloud computing environment for users and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and security processing, as described herein.

Figure 4:
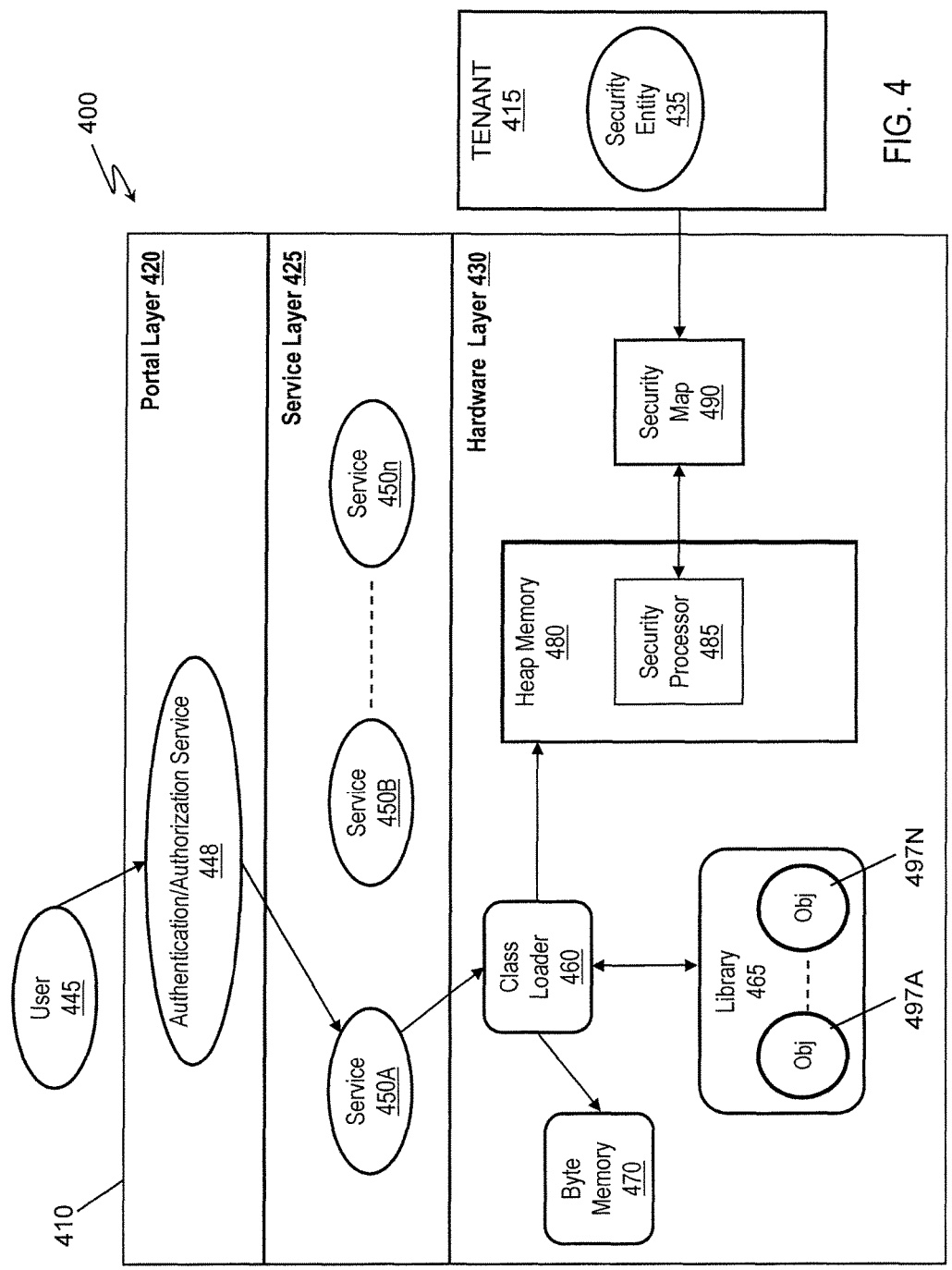
FIG. 4 shows an exemplary environment including a network information system in accordance with aspects of the present invention.

FIG. 4 illustrates a functional flow diagram of a network environment 400, in accordance with aspects of the invention. In embodiments, the network environment 400 includes a network information system 410 and a tenant 415, which is a client of an information service system that provides the network information system 410. The network information system 410 can, for example, provide a SaaS, PaaS, and/or an IaaS to the tenant 415 operated by a cloud service provider. As shown in FIG. 4, the network information system 410 includes a portal layer 420, a service layer 425, and a hardware layer 430. In embodiments, these layers may be included in the above-described, Management layer 64, the Virtualization layer 62, Hardware and Software layer 60, respectively, of FIG. 3. Although not shown in FIG. 4, the network information system 410 can include additional layers and functions, such as those discussed above with respect to FIG. 3.

The tenant 415 can be one of a number of tenants, which are clients of the network information system 410. In embodiments, the tenant 415 includes a security entity 435. The security entity 435 can be one or more users who are responsible for securing information of the tenant 415 in a cloud environment. For example, the security entity 435 may be a top security programmer of the tenant 415.

A user 445 can access one or more of services 450A . . . 450n provided by the network information system 410 through the portal layer 420. For example, the user 445 may be an individual (e.g., an employee or a customer) authorized by the tenant 415 to access its service 450A. The user 445's access to one or more of the services 450A . . . 450n can be controlled by an user authentication/authorization service 448 provided by the network information system 410.

Authentication of the user 445 may be achieved using any of various conventional security methods, known to those of skill in the art. For example, the user 445 can provide credentials (e.g., user ID and passcode) to the authentication/authorization service 448 to one or more of services 450A . . . 450n provided by the network information system 410 for the tenant 415.

After successful authentication and authorization, the user 445 can use the services 450A . . . 450n to invoke one of objects 497A . . . 497n stored in library 465 controlled by the tenant 415 of the network information system 410. In embodiments the objects 497A . . . 497n are program code hosted by the tenant on the network information service 410.

According to aspects of the invention, the user's request includes a security code of the tenant and a user credential. The security code can be provided to the user by the tenant 415. In embodiments, the security code is assigned to the tenant by the network information system 410. Alternatively, the security code can be generated by the tenant 415 itself. The security code can be, for example, a static or dynamic password. The user credential can be, for example, a user identifier (ID) and/or a passcode.

In response to the user invoking any one of the objects 497A . . . 497n, the network information system 410 attempts to store an instantiation of the object in memory. For example, the service 450A accessed by the user 445 can first retrieve a respective object 497A from library 465 and cause a classloader 460 to create an instance of the object 497A and initiate storage of the instance in a heap memory 480. In accordance with aspects of the invention, the instance of the object 497A includes the tenant security code and/or the user credential. In more specific embodiments, the classloader incorporates the tenant's security code and the user credential received from the user in a preamble of the instance.

It should be noted that to this point in the exemplary embodiments, information security has only been imposed on the user 445 in an upper layer of the system (i.e., the user portal). Further, the tenant 415 has had little participation in controlling the user 445 access to its service 450A outside of, perhaps, providing the user with the security code. Thus, from the tenant's point of view, access to the tenant's service is substantially out of its control. Consequently, the tenant 415 may have limited trust that its information is secure from unauthorized access and/or execution.

In accordance with aspects of the invention, the information service provider 410 enables the tenant 415 to participate in the information security at the hardware level of the network information system 410. More specifically, the security processor 485 resides in the hardware layer 430 of the network information system 410. In embodiments, the security processor 485 is incorporated in the heap memory 480. More specifically, the security processor 485 can be embedded within the ICs of the heap memory 480. In other embodiments, the security processor 485 is collocated and in direct communication with the heap memory 480. However, it is contemplated that the security processor 485 can be located elsewhere in the hardware layer 430.

According to aspects of the invention, the security processor 485 is a programmable device configured to prevent storage of information memory based on a security map 490. In embodiments, the security map 490 resides in memory directly addressable by the security processor 485 and associates a credential of a user with one or more of tenant security codes and/or allotted memory range of the heap memory 480.

In embodiments, the security map 490 can include information residing in memory (e.g., system memory 28) which is addressable by the security processor 485 in order to associate one or more users with respective security codes (i.e., tokens) of a tenant and/or an allocated memory range of memory. For example, in embodiments, the security processor 485 is passed to an identifier of the user and the security code of the tenant as an instance of an object. The received information can be matched to an entry in the tenant supplied security map stored by the tenant in the security processor 485, or in a memory location addressable by the security processor 485. If the information supplied in the instance does not match the information in the security map 490, the security processor prevents the instance of the object from being stored in the allotted portion of the memory. In this way, the tenant can ensure that their service or infrastructure is not being used unless authorized. Accordingly, the processes and systems of the present invention will enable a "tenant driven security model" enabling to gain the clients confidence in cloud based environments. If there is a match, then the processes continue.

According to aspects of the invention, when one or more of objects 497A . . . 497n is invoked by the user 445, a classloader 460 attempts to store an instance of the object(s) 497A . . . 497n in heap memory 480. The security processor 485 compares the security code and/or the user credential to the security map 490. If there is no match between the compared information in the security map 490, the security processor 485 prevents creation of the instance.

FIG. 5 shows an exemplary data structure for a security map 500, in accordance with aspects of the present invention. Specifically, the security map 500 is specific to a particular tenant (e.g., tenant 415). As such, in a multi-tenant environment, each tenant can be associated with a respective security map 500. In embodiments, the security map can be stored in the system memory (e.g., system memory 28) of the network information service 410, within the heap memory (e.g., heap memory 480) or within the security processor (e.g., security processor 485).

The security map 500 can include some or all the following columns: tenant identification (ID) 505, user identification 508, passcode 511, security code 513, and allotted memory range 517. Although the information in the security map 500 is illustrated as alphanumeric characters, it is contemplated that embodiments of the invention store this information in other formats, such as binary value. Further, while the information in the security map 500 is illustrated in separate columns, this information may be stored and/or combined into one or more columns and/or values. For example, the object ID, the credential ID and the user ID can be concatenated into a single binary word.

In specific embodiments, the tenant ID column 505 includes information identifying one or more tenants, (e.g., tenant 415), and the user ID column 508 includes information identifying one or more users, such as user 445. The passcode column 511 includes the user's passcode. The security code column 513 can include a security code specified by a tenant. Allotted memory range column 517 can identify the allotted portion of memory. In accordance with aspects of the invention, the tenant 415 populates the information in the security map 500.

Based on the information in the security map 500, a security processor (e.g., security processor 485) provided in a hardware layer of the system in accordance with aspects of the present invention can verify the objects invoked by a user in a tenant's service are authorized, using information provided and/or managed by the tenant itself. For example, if a user invokes object 497A, the security processor 485 may reference the security map 500. The security processor 485 can determine whether to prevent storing of an instance in memory (e.g., heap memory 480) based on a comparison between the security map 500 comparing credentials passed to the security processor from the user (e.g., user ID, passcode 511, security code 513 an/or allotted memory range 517). For example, the security processor may prevent storage of the instance if the credentials of the user that invoked the object are not included in columns 508 and 511 corresponding to the user. By enabling this direct involvement in security by the tenant, the provider of the network information system 410 increases the tenant's 415 trust in the system's security.

Figure 6:
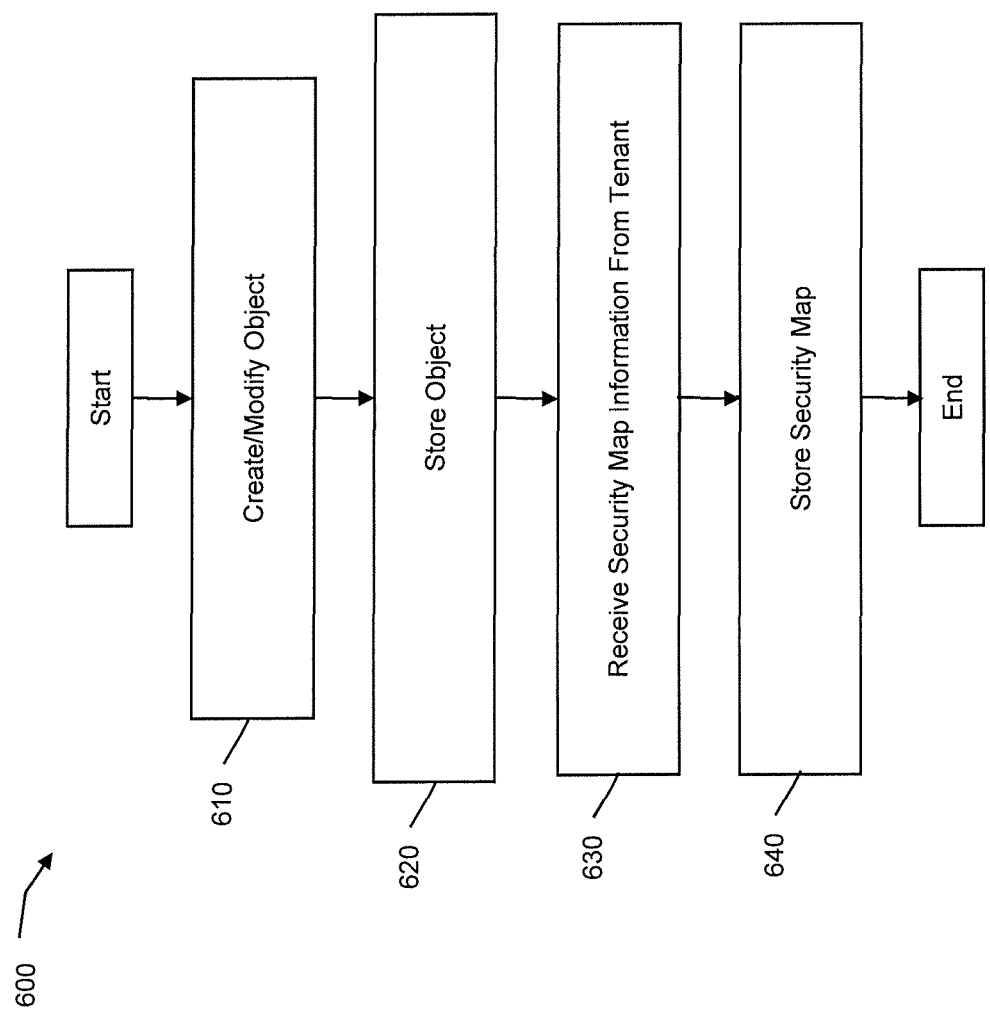
FIG. 6 shows a flow diagram of an exemplary process for providing a security map in accordance with aspects of the present invention.
Figure 7:
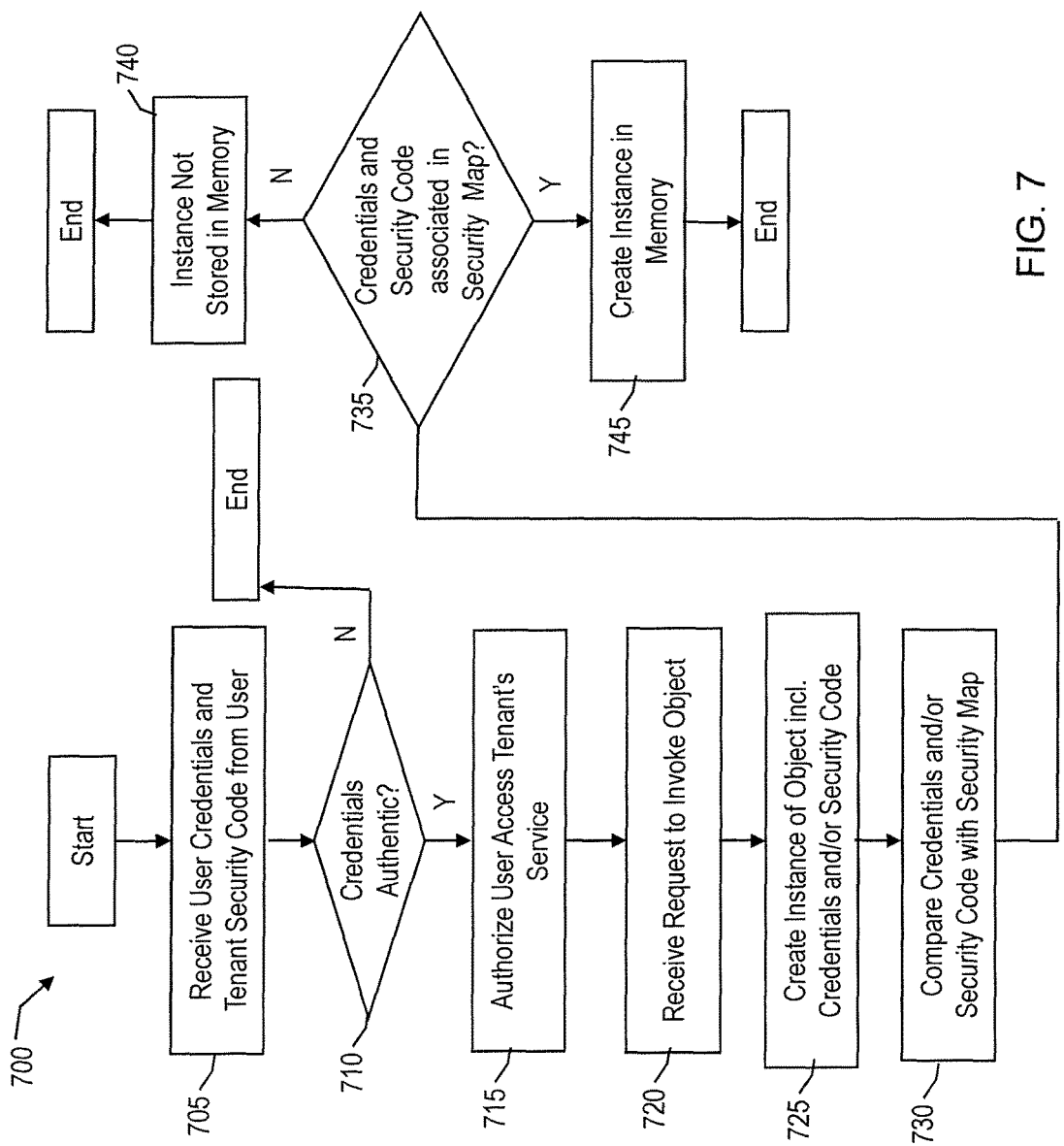
FIG. 7 shows a flow diagram of an exemplary process for authenticating execution of a tenant's information in accordance with aspects of the present invention.

FIGS. 6 and 7 show exemplary flows for performing aspects of the present invention. The steps of FIGS. 6 and 7 can be implemented in any of the environments of FIGS. 1-4. The flowcharts in FIGS. 6 and 7 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 6 shows a flow diagram of an exemplary process for implementing a security map (e.g., security map 500) in a network information system in accordance with aspects of the invention. Each tenant of a network information system (e.g., tenant 415) can provide, update and/or maintain a respective security map stored at the hardware level of the system. The security map allows the tenants to control execution of their respective information and, thereby, increase their trust in the services provided by a network information system, such as a IaaS, PaaS, or SaaS.

More specifically, at step 610, the tenant creates and/or modifies an object (e.g., object 497A) using the network information system. In embodiments, the object may be program code generated and/or modified by a software programmer or other such entity using an IaaS. At step 620, the object can be stored. At step 630, the network information system receives security map information from the tenant. For example, a top programmer (e.g., security entity 435) can provide or modify the tenant's security map to include information corresponding to users that may invoke the object. In embodiments, the tenant provides the security map information via an external interface (e.g., external interface 495) of the security processor (e.g., security processor 485). By enabling the security entity of the tenant to create, update and/or maintain the security map, the tenant is provided with greater trust with respect to the security of the tenant's information stored by the network information system. At step 640, the security map and its contents can be stored.

FIG. 7 shows a flow diagram of an exemplary process for authorizing execution of an object hosted a network information system for a tenant in accordance with aspects of the present invention. The network information system (e.g., network information system 410) includes a security processor (e.g., security processor 485) that prevents a memory device (e.g., heap memory 480) from storing an object (e.g., object 497A) based on a tenant-defined security map (e.g., security map 490) at a hardware layer (e.g., hardware layer 430).

More specifically, at step 705, the network information system receives a user's (e.g., user 445) request to access a tenant's service (e.g., service 450A). At step 710, the network information system determines whether the credentials (e.g., user ID and passcode) provided by the user are authentic. If the credentials are not authentic, the process ends; however, if the credentials are authentic, then at step 715, the network information system authorizes the user to access a tenant's service corresponding to the authenticated credentials. In alternate embodiments, if there is no authentication, the network information can refuse the user access and/or require the user to submit proper credentials in the conventional manner. At step 720, the network information system (e.g., via one of services 450A ... 450n) receives the users request for invocation of an object of the tenant. For instance, the user may submit a request service 450A, which causes the service to invoke object 497A stored in the tenant's library 465.

At step 725, the network information system creates an instance of the invoked object, including the user's credentials and/or the tenant's security code, and attempts to store the instance in the systems heap memory. For example, upon invocation of object 497A, classloader 460 can create an instance of the object, along with a preamble include a user credential and the tenant security code. The classloader can obtain this information from information provided by the user to the authentication/authorization service 448. Alternatively, the service 450A can request the user credential and security code information.

At step 730, the security processor compares the user credential and security code information to the information stored in the security map by the tenant. If, at step 735, it is determined that one of the user credential is not stored in association with the tenant security code in the security map, then at step 740, the security processor can prevent the object instances from being stored in the heap memory. If, at step 735, it is determined that the user credential is stored in association with the tenant's security code is in the security map, then at step 745, the security processor can create an instance of the object for storage in the heap memory.

As described in the embodiment above, the tenant can ensure that their service or infrastructure is not used unless notified and authenticated by them and, thereby, increase the tenant's confidence in cloud based environments. Although the process shown in FIG. 7 describes authenticating a single code for single object, it is understood that a single object may be associated with a series of codes.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Many modifications and variations will be apparent to those of ordinary skill in the art without departing from the scope and spirit of the invention. The corresponding structures, materials, acts, and equivalents of all means or step plus function elements in the claims, if applicable, are intended to include any structure, material, or act for performing the function in combination with other claimed elements as specifically claimed. Accordingly, while the invention has been described in terms of embodiments, those of skill in the art will recognize that the invention can be practiced with modifications and in the spirit and scope of the appended claims.

What is claimed:

1. A method, comprising:
   passing an instance of an object, invoked by a user, to a memory device within a system memory at a hardware layer of a network information system, the object being one of a plurality of objects hosted for a tenant of a network information service;
   determining, by a processing unit within the system memory, that storage of the object in the memory device is authorized by the tenant based on a security map provided by the tenant and accessible by the processing unit within system memory; and
   preventing, by the processing unit, storage of the instance in the memory device based on the result of the determining,
   wherein the memory device comprises a RAM and a heap memory,
   wherein the processing unit is a security processor embedded within the heap memory, and
   wherein the security map resides in memory directly accessible by the security processor.

2. The method of claim 1, wherein the determining that the storing of the object is authorized comprises determining that a user credential received from the user and included in the instance of the object is identified in the security map.

3. The method of claim 1, wherein determining that storing the object is authorized by the tenant comprises determining that that the security map includes an entry associating the user credential and a tenant security code.

4. The method of claim 3, wherein the determining that the storing of the object is authorized comprises determining that the user credential and a tenant security code match information in the entry.

5. The method of claim 1, wherein the security map associates the user with an allotted range of the memory device.

6. The method of claim 1, further comprising:
   receiving the user credential and the tenant security code from the user; and
   incorporating the user credential and the tenant security code into the instance of the object.

7. The method of claim 1, wherein the steps of claim 1 are at least one of created, maintained, deployed and supported by a service provider.

8. The method of claim 1, wherein steps of claim 1 are provided by a service provider on a subscription, advertising, and/or fee basis.

9. The method of claim 1, wherein:
the network information system includes a portal layer, a service layer, and the hardware layer;
the hardware layer includes a class loader, a library storing the object, the heap memory, the security processor, and the security map;
the method further comprises authenticating the user via the portal layer; and
the passing the instance of the object to the memory device comprises:
retrieving the object from the library in response to the user invoking the object via one of a plurality of services hosted for the tenant in the service layer;
creating an instance of the object by the class loader; and
initiating storage of the instance of the object in the heap memory; and
the determining by the processing unit that storage of the object in the memory device is authorized by the tenant comprises determining whether a credential or security code provided by the user via the portal layer matches information in the security map.

10. The method of claim 1, wherein the network information system includes a service layer and a portal layer which are upper layers above the hardware layer, and wherein the security map is formed in the hardware layer.

11. A system for providing an information service to a tenant comprising:
a security processor within a system memory;
a computer-readable memory within the system memory, the computer-readable memory storing a security map that is accessible by the security processor within the system memory,
wherein the security processor accesses the security map and matches a user credential passed to the security processor in an instance with the security map and prevents the storing of information in a memory device,
wherein the computer-readable memory comprises a RAM and a heap memory,
wherein the security processor is embedded within the heap memory, and
wherein the security map resides in memory directly accessible by the security processor.

12. The system of claim 11, wherein the memory device is a heap memory of the system.

13. The system of claim 12, wherein the security map associates the user credential with a tenant security code.

14. The system of claim 13, wherein the security map further associates the user credential with an allotted range of the heap memory.

15. The system of claim 13, wherein the security processor is configured to determine that the user credential is included in the security map.

16. The system of claim 13, wherein the security processor is configured to determine that the user credential and the tenant security code are associated in the security map.

17. The system of claim 16, wherein the security processor is configured to determine that the user credential and the tenant security code match an entry of the security map.

18. The system of claim 11, wherein the system is configured to:
receive the user credential and a tenant security code from the user; and
incorporate the user credential and the tenant security code in an instance of an object.

19. The system of claim 11, wherein the security processor is configured to:
compare the user credential and a tenant security code incorporated in an instance of an object with one or more entries in the security map; and
determine that the user credential and the tenant security code incorporated in the instance of the object match one or more entries in the security map.

20. A computer program product comprising:
a security processor within a system memory;
a computer readable storage device having readable program code embodied in the storage device that, when executed by the security processor, causes the computer program product to store an instance of one or more objects retrieved from a library in a memory device within the system memory based on receiving a user credential and a token of an owner of the one or more objects in the instance,
wherein the computer readable storage device comprises a RAM and a heap memory,
wherein the security processor is embedded within the heap memory, and
wherein the readable program code resides in memory directly accessible by the security processor.

21. A computer system comprising:
a CPU;
a computer readable storage media;
a system memory including a security processor and a memory device;
first program instructions, executed by the CPU, that pass an instance of an object to the memory device of the system, the object being one of a plurality of objects hosted for a tenant that has been invoked by a user;
second program instructions, executed by the security processor, that determine that storage of the object in the memory device is not authorized by the tenant based on a security map provided by the tenant; and
third program instructions, executed by the security processor, that prevent storage of the instance in the memory device based on the result of the determining,
wherein the memory device comprises the security map, a RAM and a heap memory,
wherein the security processor is embedded within the heap memory, and
wherein the security map resides in memory directly accessible by the security processor.

22. A method for providing an information service to a tenant, comprising:
passing an instance of an object to a memory device within a system memory of a hardware layer of a network information system, the object being one of a plurality of objects hosted for a tenant that has been invoked by a user;
determining by a security processor within the memory device that storage of the object is authorized by the tenant based on a security map provided by the tenant and accessible by the security processor from within the system memory,
wherein the memory device comprises a RAM and a heap memory,
wherein the security processor is embedded within the heap memory, and
wherein the security map resides in memory directly accessible by the security processor.

23. The method of claim 22, further comprising:
receiving the user credential and the tenant security code from the user; and
incorporating the user credential and the tenant security code into an instance of the object.

24. The method of claim 22, wherein the method comprises the security processor:
comparing the user credential and the tenant security code incorporated in the instance of the object with one or more entries in the security map; and
determining that the user credential and the tenant security code incorporated in the instance of the object match one or more entries in the security map.

25. The method of claim 22, wherein the memory device is a heap memory of the system.

\* \* \* \* \*